(12) United States Patent
Brown et al.

(10) Patent No.: US 9,366,864 B1
(45) Date of Patent: Jun. 14, 2016

(54) SYSTEM FOR AND METHOD OF DISPLAYING INFORMATION WITHOUT NEED FOR A COMBINER ALIGNMENT DETECTOR

(75) Inventors: Robert D. Brown, Lake Oswego, OR (US); Kurt A. Stahl, Portland, OR (US); Lincoln J. Burns, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1016 days.

(21) Appl. No.: 13/432,662

(22) Filed: Mar. 28, 2012

Related U.S. Application Data

(63) Continuation-in-part of application No. 13/251,087, filed on Sep. 30, 2011, now Pat. No. 8,903,207, and a continuation-in-part of application No. 13/250,970, filed on Sep. 30, 2011, now Pat. No. 8,937,772, and a continuation-in-part of application No. 13/250,994, filed on Sep. 30, 2011, now Pat. No. 8,749,890, and a continuation-in-part of application No. 13/250,621, filed on Sep. 30, 2011, now Pat. No. 8,634,139, and a continuation-in-part of application No. 13/250,940, filed on Sep. 30, 2011, now abandoned, and a continuation-in-part of application No. 13/250,858, filed on Sep. 30, 2011.

(51) Int. Cl.
*G02B 17/08* (2006.01)
*G02B 27/01* (2006.01)
*F21V 8/00* (2006.01)
*G02B 5/30* (2006.01)

(52) U.S. Cl.
CPC .............. *G02B 27/0101* (2013.01); *G02B 5/30* (2013.01); *G02B 6/0016* (2013.01); *G02B 27/0149* (2013.01); *G02B 2027/0123* (2013.01)

(58) Field of Classification Search
None
See application file for complete search history.

(56) References Cited

U.S. PATENT DOCUMENTS

| | | |
|---|---|---|
| 2,141,884 A | 12/1938 | Sonnefeld |
| 3,851,303 A | 11/1974 | Muller |
| 3,885,095 A | 5/1975 | Wolfson et al. |

(Continued)

FOREIGN PATENT DOCUMENTS

| | | |
|---|---|---|
| DE | 10 2006 03 785 | 7/2007 |
| EP | 2 110 701 | 10/2009 |

(Continued)

OTHER PUBLICATIONS

Final Office Action on U.S. Appl. No. 13/250,940 Dated Oct. 17, 2014, 15 pages.

(Continued)

*Primary Examiner* — Daniel Petkovsek
(74) *Attorney, Agent, or Firm* — Donna P. Suchy; Daniel M. Barbieri

(57) ABSTRACT

A display can be utilized with an image source. The display includes a collimator and a substrate waveguide. The substrate waveguide sees collimated light from the collimator at an input and provides the collimated light to an output. The collimated light travels from the input to the output within the substrate by total internal reflection. An input diffraction grating is disposed in a first area at the input and an output diffraction grating is disposed in a second area at the output. The second diffraction grating is matched to the first diffraction grating. A combiner alignment detector is not required due to the periscopic effect according to one embodiment.

6 Claims, 4 Drawing Sheets

(56) References Cited

U.S. PATENT DOCUMENTS

| | | |
|---|---|---|
| 3,940,204 A | 2/1976 | Withrington |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |
| 4,309,070 A | 1/1982 | St. Leger Searle |
| 4,647,967 A | 3/1987 | Kirschner et al. |
| 4,711,512 A | 12/1987 | Upatnieks |
| 4,714,320 A | 12/1987 | Banbury |
| 4,743,083 A | 5/1988 | Schimpe |
| 4,749,256 A | 6/1988 | Bell et al. |
| 4,775,218 A | 10/1988 | Wood et al. |
| 4,854,688 A | 8/1989 | Hayford et al. |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,303,085 A | 4/1994 | Rallison |
| 5,317,405 A | 5/1994 | Kuriki et al. |
| 5,341,230 A | 8/1994 | Smith |
| 5,351,151 A | 9/1994 | Levy |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,856,842 A | 1/1999 | Tedesco |
| 5,868,951 A | 2/1999 | Schuck et al. |
| 5,886,822 A * | 3/1999 | Spitzer ............... G02B 27/0172 359/630 |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,721,096 B2 | 4/2004 | Bruzzone et al. |

(56) References Cited

U.S. PATENT DOCUMENTS

| | | | |
|---|---|---|---|
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 * | 4/2006 | Amitai ............... 359/857 |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,285,903 B2 | 10/2007 | Cull et al. |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 * | 8/2008 | Mukawa et al. ......... 385/31 |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 * | 11/2008 | Amitai ............... G02B 6/0018 345/7 |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 * | 8/2009 | Maliah et al. ............... 359/630 |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 * | 6/2010 | Brown ............... G02B 17/0856 359/630 |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |

(56) References Cited

U.S. PATENT DOCUMENTS

| | | |
|---|---|---|
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | Dejean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,472,119 B1 | 6/2013 | Kelly |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,670,029 B2 | 3/2014 | McEldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,938,141 B2 | 1/2015 | Magnusson |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0089842 A1 | 5/2004 | Sutehrland et al. |
| 2004/0188617 A1 | 9/2004 | Devitt et al. |
| 2004/0208446 A1 | 10/2004 | Bond et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0119916 A1 | 6/2006 | Sutherland et al. |
| 2006/0132914 A1 | 6/2006 | Weiss et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2007/0019152 A1 | 1/2007 | Caputo et al. |
| 2007/0019297 A1* | 1/2007 | Stewart et al. ............ 359/630 |
| 2007/0041684 A1 | 2/2007 | Popovich et al. |
| 2007/0045596 A1 | 3/2007 | King et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0296163 A1 | 11/2010 | Saarikko |
| 2010/0315719 A1 | 12/2010 | Saarikko et al. |
| 2010/0321781 A1 | 12/2010 | Levola et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0235179 A1 | 9/2011 | Simmonds |
| 2011/0238399 A1 | 9/2011 | Ophir et al. |
| 2011/0242349 A1 | 10/2011 | Izuha et al. |

(56) References Cited

U.S. PATENT DOCUMENTS

| | | |
|---|---|---|
| 2011/0242661 A1 | 10/2011 | Simmonds |
| 2011/0242670 A1 | 10/2011 | Simmonds |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0300311 A1 | 11/2012 | Simmonds et al. |
| 2013/0069850 A1 | 3/2013 | Mukawa et al. |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0200710 A1 | 8/2013 | Robbins |
| 2013/0249895 A1 | 9/2013 | Westerinen et al. |
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0104665 A1 | 4/2014 | Popovich et al. |
| 2014/0104685 A1 | 4/2014 | Bohn et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2015/0010265 A1 | 1/2015 | Popovich et al. |

FOREIGN PATENT DOCUMENTS

| | | |
|---|---|---|
| EP | 2 225 592 | 9/2010 |
| EP | 2 381 290 | 10/2011 |
| EP | 2 733 517 | 5/2014 |
| FR | 2677463 | 12/1992 |
| WO | WO-99/52002 | 10/1999 |
| WO | WO-03/081320 A1 | 10/2003 |
| WO | WO-2006/002870 | 1/2006 |
| WO | WO-2007/130130 A3 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2010/125337 A3 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |

OTHER PUBLICATIONS

Irie, Masahiro, Photochromic diarylethenes for photonic devices, Pure and Applied Chemistry, 1996, pp. 1367-1371, vol. 68, No. 7, IUPAC.

Non-Final Office Action on U.S. Appl. No. 13/864,991 Dated Oct. 22, 2014, 16 pages.

Office Action on U.S. Appl. No. 13/892,026 Dated Dec. 8, 2014, 19 pages.

Office Action on U.S. Appl. No. 13/892,057 Dated Nov. 28, 2014, 17 pages.

Plastic has replaced glass in photochromic lens, www.plastemart.com, 2003, 1 page.

Webster's Third New International Dictionary 433 (1986), 3 pages.

Office Action for U.S. Appl. No. 13/250,621, mail date May 21, 2013, 10 pages.

Office Action for U.S. Appl. No. 13/250,940, mail date Mar. 12, 2013, 11 pages.

Non-Final Office Action on U.S. Appl. No. 13/250,858 Dated Sep. 15, 2014, 16 pages.

Notice of Allowance on U.S. Appl. No. 13/250,970 dated Sep. 16, 2014, 7 pages.

Notice of Allowance on U.S. Appl. No. 13/251,087 Dated Jul. 17, 2014, 8 pages.

Office Action for U.S. Appl. No. 13/250,940, mail date Aug. 28, 2013, 15 pages.

Office Action for U.S. Appl. No. 13/250,970, mail date Jul. 30, 2013, 4 pages.

Office Action for U.S. Appl. No. 13/250,994, mail date Sep. 16, 2013, 11 pages.

Cameron, A., The Application of Holographic Optical Waveguide Technology to Q-Sight™ Family of Helmet Mounted Displays, Proc. of SPIE, 2009, 11 pages, vol. 7326.

Wisely, P.L., Head up and head mounted display performance improvements through advanced techniques in the manipulation of light, Proc. of SPIE, 2009, 10 pages, vol. 7327.

Office Action for U.S. Appl. No. 13/250,858, mail date Oct. 28, 2013, 9 pages.

Final Office Action in U.S. Appl. No. 13/864,991, dated Apr. 2, 2015, 16 pages.

Final Office Action on U.S. Appl. No. 13/892,057 Dated Mar. 5, 2015, 21 pages.

Ayras et al., Exit Pupil Expander with a Large Field of View Based on Diffractive Optics, Journal of the SID, 2009, 6 pages.

Office Action for U.S. Appl. No. 13/250,858 Dated Feb. 19, 2014, 13 page.

Final Office Action on U.S. Appl. No. 13/250,858 Dated Feb. 4, 2015, 18 pages.

Non-Final Office Action on U.S. Appl. No. 14/038,400 Dated Feb. 5, 2015, 18 pages.

Notice of Allowance for U.S. Appl. No. 12/700,557, mail date Oct. 22, 2013, 9 pages.

Office Action for U.S. Appl. No. 12/700,557, mail date Aug. 9, 2013, 12 pages.

Office Action for U.S. Appl. No. 12/700,557, mail date Feb. 4, 2013, 11 pages.

Office Action on U.S. Appl. No. 13/250,940 Dated Mar. 25, 2014, 12 pages.

Office Action on U.S. Appl. No. 13/251,087 Dated Mar. 28, 2014, 12 pages.

Amendment and Reply for U.S. Appl. No. 12/571,262, mail date Dec. 16, 2011, 7 pages.

Amitai, Y., et al. "Visor-display design based on planar holographic optics," Applied Optics, vol. 34, No. 8, Mar. 10, 1995, pp. 1352-1356.

Ayras, et al., "Exit pupil expander with a large field of view based on diffractive optics", Journal of the Society for Information Display, 17/8, 2009, pp. 659-664.

Caputo, R. et al., POLICRYPS Switchable Holographic Grating: A Promising Grating Electro-Optical Pixel for High Resolution Display Application; Journal of Display Technology, vol. 2, No. 1, Mar. 2006, pp. 38-51, 14 pages.

Crawford, "Switchable Bragg Gratings", Optics & Photonics News, Apr. 2003, pp. 54-59.

Extended European Search Report for EP Application No. 13192383, dated Apr. 2, 2014, 7 pages.

Final Office Action on U.S. Appl. No. 13/892,026 Dated Apr. 3, 2015, 17 pages.

International Preliminary Report on Patentability for PCT Application No. PCT/US2013/038070, dated Oct. 28, 2014, 6 pages.

(56) References Cited

OTHER PUBLICATIONS

International Search Report and Written Opinion regarding PCT/US2013/038070, mail date Aug. 14, 2013, 14 pages.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/250,940 Dated Mar. 18, 2015, 17 pages.
Non-Final Office Action on U.S. Appl. No. 13/844,456 Apr. 1, 2015, XX Pages.
Non-Final Office Action on U.S. Appl. No. 13/869,866 Dated May 28, 2014, 16 pages.
Non-Final Office Action on U.S. Appl. No. 14/044,676 Dated Apr. 9, 2015, 13 pages.
Non-Final Office Action on U.S. Appl. No. 14/225,062 Dated May 21, 2015, 11 pages.
Nordin, G., et al., Journal of the Optical Society of America A., vol. 9, No. 12, Dec. 1992, pp. 2206-2217, 12 pages.
Office Action for U.S. Appl. No. 12/571,262, mail date Sep. 28, 2011, 5 pages.
Office Action for U.S. Appl. No. 13/355,360, mail date Sep. 12, 2013, 7 pages.
Press Release, "USAF Awards SBG Labs an SBIR Contract for Wide Field of View HUD", SBG Labs—DigiLens, Apr. 2013, 1 page.
Press Release: "Navy awards SGB Labs a contract for HMDs for simulation and training", Press releases, DigiLens, Oct. 2012, pp. 1-2, retrieved from the internet at http://www.digilens.com/pr10-2012.2.php. 2 pages.
Requirement for Restriction/Election on U.S. Appl. No. 13/844,456 Dated Sep. 12, 2014, 23 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Non-Final Office Action on U.S. Appl. No. 13/250,858 dated Jun. 12, 2015, 20 pages.

\* cited by examiner

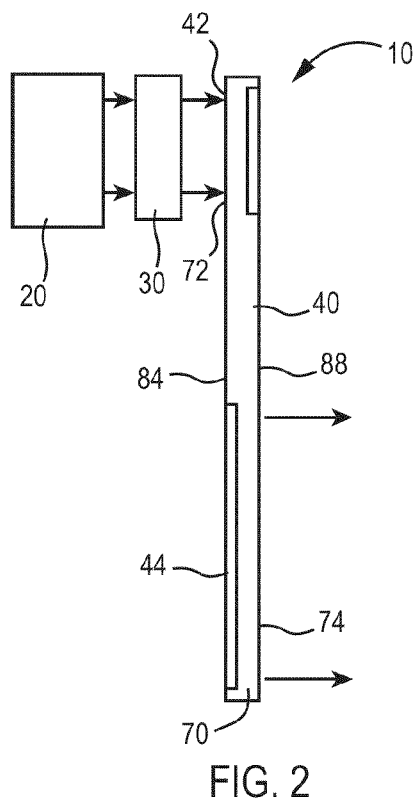
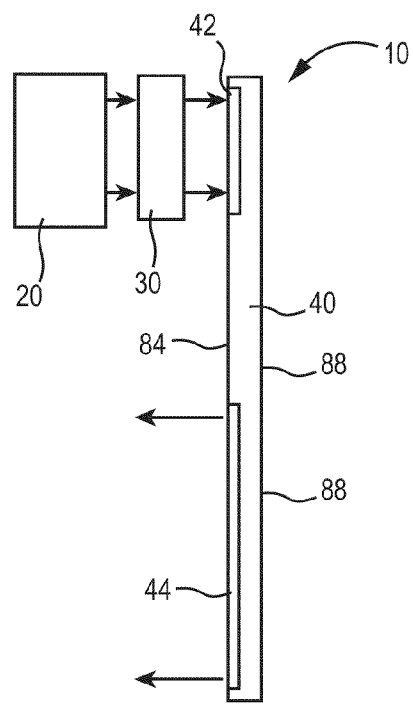
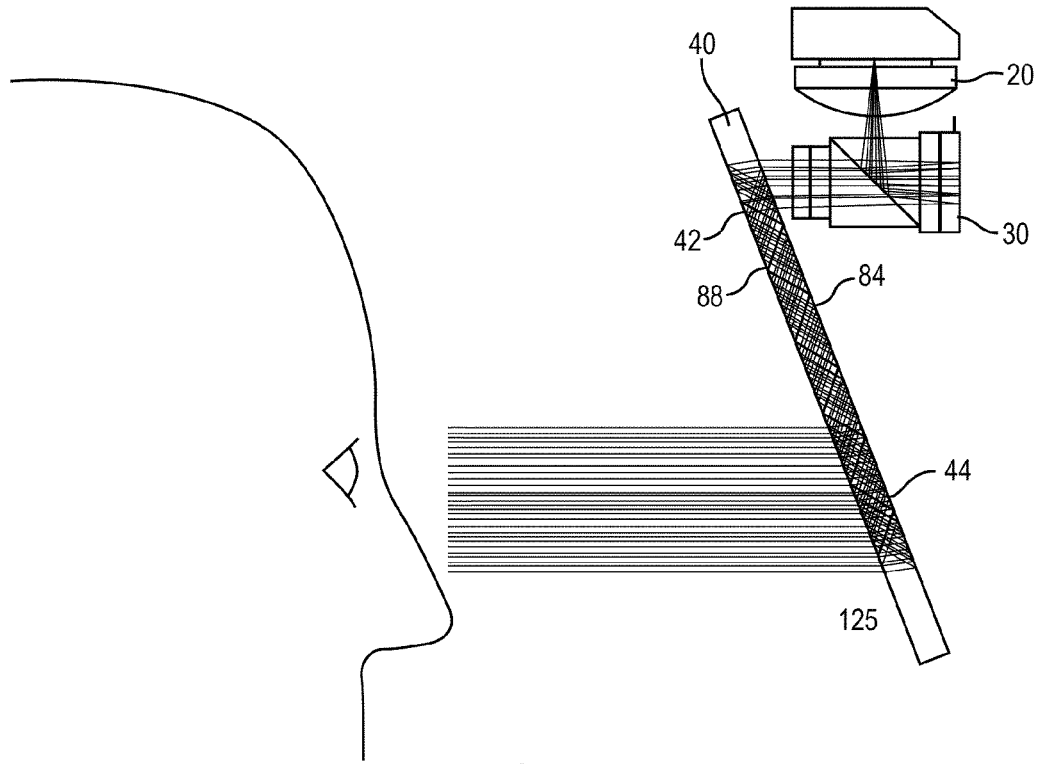
FIG. 2
FIG. 4
FIG. 3

SYSTEM FOR AND METHOD OF DISPLAYING INFORMATION WITHOUT NEED FOR A COMBINER ALIGNMENT DETECTOR

CROSS REFERENCE TO RELATED APPLICATIONS

The present application is a continuation-in-part of and claims the benefit of priority to: U.S. patent application Ser. No. 13/250,621 filed on Sep. 30, 2011 entitled "System For And Method of Catadioptric Collimation In A Compact Head Up Display (HUD)", now U.S. Pat. No. 8,634,139, incorporated herein by reference in its entirety and assigned to the assignee of the present application; "U.S. patent application Ser. No. 13/250,940, entitled, "Head Up Display (HUD) Utilizing Diffractive Gratings Having Optimized Efficiency," filed on Sep. 30, 2011, incorporated herein by reference in its entirety, and assigned to the assignee of the present application; U.S. patent application Ser. No. 13/250,858, entitled, "Ultra-Compact HUD Utilizing Waveguide Pupil Expander With Surface Relief Gratings In High Refractive Index Materials," filed on Sep. 30, 2011, incorporated herein by reference in its entirety, and assigned to the assignee of the present application; U.S. patent application Ser. No. 13/251,087, entitled, "System for and Method of Extending Vertical Field of View in Head Up Display Utilizing a Waveguide Combiner," filed on Sep. 30, 2011, incorporated herein by reference in its entirety, and assigned to the assignee of the present application; U.S. patent application Ser. No. 13/250,970, entitled, "System For and Method of Stowing HUD Combiners," filed on Sep. 30, 2011, now U.S. Pat. No. 8,634,139, and assigned to the assignee of the present application, incorporated herein by reference in its entirety; and U.S. patent application Ser. No. 13/250,994, entitled, "Compact Head Up Display (HUD) for Cockpits with Constrained Space Envelopes," now U.S. Pat. No. 8,749,890, filed on Sep. 30, 2011, incorporated herein by reference herein in its entirety and assigned to the assignee of the present application. The present application is also related to: U.S. application Ser. No. 13/432,731 entitled "Transmitted Order Recovery Reflector And Cover Glass For Substrate Guided HUD", now U.S. Pat. No. 8,930,588 filed on Mar. 28, 2012, incorporated herein by reference herein in its entirety and assigned to the assignee of the present application; U.S. application Ser. No. 12/571,262, entitled "Optical Displays" filed Sep. 30, 2009, incorporated herein by reference herein in its entirety and assigned to the assignee of the present application; and U.S. application Ser. No. 12/700,557, entitled "Worn Display System And Method Without Requiring Real Time Tracking For Boresight Precision" filed on Feb. 4, 2010, now U.S. Pat. No. 8,654,826, incorporated herein by reference herein in its entirety and assigned to the assignee of the present application.

BACKGROUND OF THE INVENTION

The present specification relates to displays. More particularly, the present specification relates to head up displays (HUDs).

HUDs can be used in a variety of applications. In aircraft applications, HUDs can provide significant safety and operational benefits including precise energy management and conformal flight paths. These safety and operational benefits are enjoyed by operators of air transport aircraft, military aircraft, regional aircraft and high end business jets where HUDs are generally employed. These safety and operational benefits are also desirable in smaller aircraft.

Conventional HUDs generally include a combiner assembly and optics for projecting information to a combiner disposed in the combiner assembly. A conventional stow mechanism can be attached to the combiner assembly and used to rotate the combiner about a single axis to and from a stowed position and an operational position. In the stowed position, the combiner is in a position that does not obstruct the pilot, especially during ingress and egress to and from the pilot's seat in the cockpit. In addition, the stow mechanism can include a break away mechanism which positions the combiner away from the pilot in the event of a catastrophic event.

Conventional HUDs require that the alignment between the combiner and the projection optics be monitored to prevent misalignment errors. Small deflections in the position of the combiner with respect to the projection optics can cause significant alignment errors associated with the information or symbology projected by the optics onto the combiner. Alignment errors associated with symbology and its placement in the real world view can result in misleading information. Imprecision in the stow mechanism can contribute to alignment errors when the combiner is moved to and from the operational position and the stowed position.

According to one conventional system, an optical monitor can be employed to detect alignment errors. One conventional technique employs a light emitting diode (LED), a mirror and a photosensitive diode to form a Combiner Alignment Detector (CAD). A conventional CAD is discussed in U.S. Pat. No. 4,775,218.

The LED and photosensitive diode of the CAD can be mounted on the fixed part of the combiner assembly and the mirror can be mounted on the moving portion of the combiner assembly. When the combiner is mis-positioned, a beam of light from the LED is deflected by the mirror and hits the photo diode off-center inducing an asymmetric signal that can be processed to calculate the error. If the error is too large, an ALIGN HUD message can be displayed.

CADs can be disadvantageous for a number of reasons. First, the CAD adds to the cost of the HUD and can be expensive to manufacture. Second, the CAD requires calibration which adds to manufacturing and service costs. Third, the CAD can be subject to failure. Fourth, a conventional CAD can give an erroneous ALIGN HUD message that may result from stray light, sunlight, dirt, or unknown electrical faults.

Therefore, there is a need for a HUD that does not require a CAD. Further, there is a need for a compact HUD which uses optics optimized for impunity to alignment errors. Yet further still, there is also a need for a small volume, lightweight, lower cost HUD. Yet further, there is a need for a substrate waveguide HUD with symmetrical couplers. Yet further, there is a need for a HUD with less angular and/or positional sensitivity. Yet further still, there is a need for a combiner configured so that a CAD is not required even when a less precise stow mechanism is utilized.

SUMMARY OF THE INVENTION

An exemplary embodiment relates to a head up display for use with a micro image source. The head up display includes a collimator, a substrate waveguide, and a stow mechanism. The collimator is disposed between the combiner and the image source. The substrate waveguide acts as a combiner and receives collimated light from the collimator at an input and provides the collimated light to an output. The collimated light travels from the input to the output within the substrate waveguide by total internal reflection. An input diffraction grating is disposed in a first area at the input, and an output diffraction grating is disposed in a second area at the output.

The second diffraction grating is parallel with respect to the first diffraction grating or perpendicular to the first diffraction grating. The second diffraction grating is matched to the first diffraction grating to achieve a periscopic effect. A combiner alignment detector is preferably not required due to the periscopic effect.

Another exemplary embodiment relates to a method of providing information to a user without requiring a combiner alignment detector. The method includes providing light from an image source to a collimator. The method also includes providing the light from the collimator to a combiner. Light travels from an input of the combiner to an output of the combiner by total internal reflection. An input diffraction grating is disposed in a first area at the input and an output diffraction grating is disposed in a second area at the output. The output diffraction grating is parallel with respect to the input diffraction grating or perpendicular to the input diffraction grating. The input diffraction grating is matched to the output diffraction grating to achieve a periscopic effect.

Another exemplary embodiment relates to a display for providing an image. The display includes a micro image source and collimating optics. The collimating optics receive the image from the micro image source. The display also includes a combiner and a stow mechanism. The combiner receives collimated light from collimating optics at an input and provides the collimating light to an output. The collimated light travels from the input to the output within the combiner by total internal reflection. The stow mechanism is for moving the combiner out of a head path in the event of a crash or for moving the combiner to and from an operational position and a stowed position. An input diffraction grating is disposed at the input and an output diffraction grating is disposed at the output. The combiner is configured to achieve a periscopic effect.

BRIEF DESCRIPTION OF THE DRAWINGS

Exemplary embodiments are hereafter described with reference to the accompanying drawings, wherein like numerals denote like elements; and:

FIG. 2 is a general block diagram of a head up display (HUD) system for use in the environment illustrated in FIG. 1 in accordance with an exemplary embodiment;

FIG. 3 is a side view schematic drawing of the HUD system illustrated in FIG. 2 in accordance with an exemplary embodiment;

FIG. 4 is a general block diagram of a HUD system for use in the environment illustrated in FIG. 1 in accordance with another exemplary embodiment;

DETAILED DESCRIPTION OF THE PREFERRED EMBODIMENTS

Figure 1:
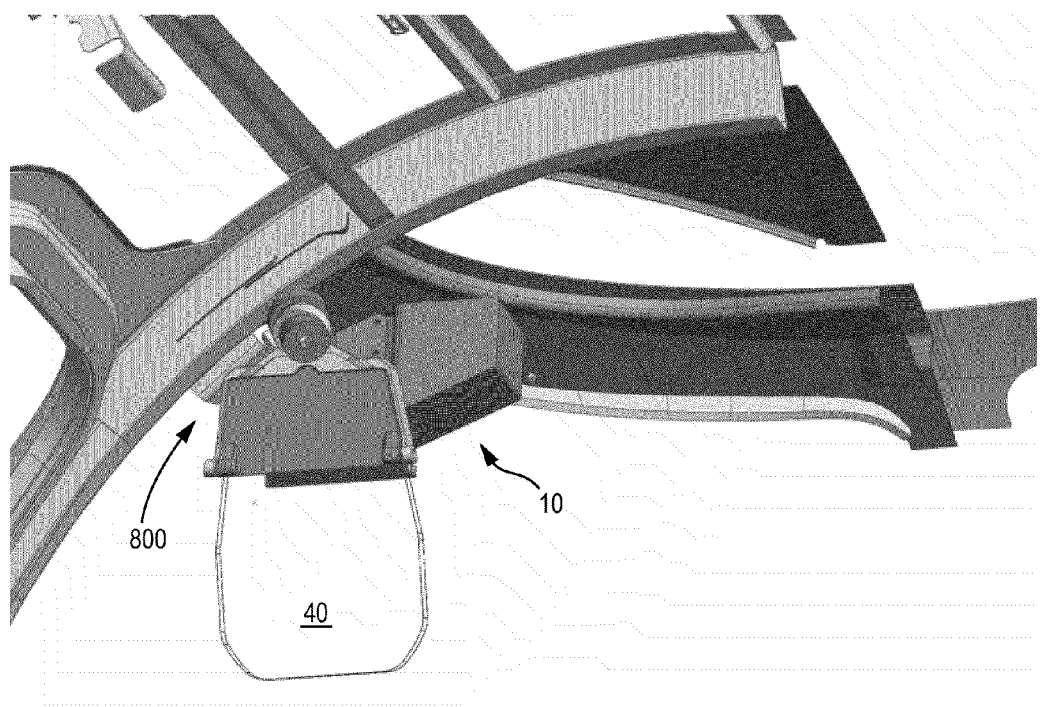
FIG. 1 is a perspective view of an environment for a HUD system including a stow mechanism in accordance with an exemplary embodiment.

Before describing in detail the particular improved system and method, it should be observed that the invention includes, but is not limited to, a novel structural combination of optical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

With reference to FIG. 1, a display, such as, a head up display (HUD) system 10, can be utilized in various applications, including aviation, medical, naval, targeting, ground based, military, etc. HUD system 10 can be configured for use in smaller cockpit environments and yet provides an appropriate field of view and eye box for avionic applications in one embodiment.

A stow mechanism 800 can be integrated with or attached to a substrate waveguide 40 associated with HUD system 10. Mechanism 800 moves combiner or waveguide 40 out of a head path in a crash event and/or aligns the combiner to collimating optics 30 when in an operational position and moves the combiner out of the pilot's view in a stowed position.

With reference to FIGS. 2 and 3, an embodiment of HUD system 10 preferably includes an image source 20 and substrate waveguide 40. Image source 20 can be any device for providing an image including but not limited to a CRT display, an LED display, an active matrix liquid crystal display (LCD), etc. In one embodiment, image source 20 is a micro LCD assembly and can provide linearly polarized light. The micro LCD assembly can be back lit by an LED source or other source of light.

In addition, system 10 can include collimating optics 30 disposed between substrate waveguide 40 and image source 20. Collimating optics 30 can be a single optical component, such as a lens, or include multiple optical components. In one embodiment, collimating optics 30 are configured as a catadioptric collimator as described with reference to FIG. 5. However, HUD system 10 can be utilized with a variety of collimating projectors and is not limited to the details discussed with reference to FIG. 5. Collimating optics 30 can be any optical component or configuration of optical components that provide light (preferably collimated light) from image source 20 to substrate waveguide 40. Collimating optics 30 can be integrated with or spaced apart from image source 20 and/or substrate waveguide 40.

In operation, HUD system 10 provides images from image source 20 to a pilot or other operator so that the pilot can simultaneously view the images and a real world scene. The images can include graphic and/or text information (e.g., flight path vector, etc.) related to avionic information in one embodiment. In addition, the images can include synthetic or enhanced vision images. In one embodiment, collimated light representing the image from image source 20 is provided on substrate waveguide 40 so that the pilot can view the image conformally on the real world scene through substrate waveguide 40. Waveguide 40 is preferably transparent for viewing the real world scene through main surfaces or sides 84 and 88 and operates as a combiner in one embodiment.

Advantageously, system 10 is configured in accordance with one embodiment to reduce costs and reliability concerns associated with monitoring waveguide 40 for alignment. Preferably, system 10 does not require a combiner alignment detector (CAD).

HUD system 10 is preferably configured to provide a periscopic effect according to one embodiment. System 10 and waveguide 40 can be configured so that waveguide 40 has no or very little positional or angular sensitivity. System 10 relies upon the use of an optical periscope-like configuration to achieve this effect.

A periscope generally utilizes two offset parallel mirrors to redirect a beam of light from one optical access to another parallel optical access laterally or vertically displaced. A feature of the periscope is that regardless of the orientation of the mirrors, the ray of exiting light exiting the periscope is always parallel to the ray of light entering the periscope. This behavior is true for all six degrees of freedom or orientation. The periscope can also be arranged such that the rays of light exiting the device travel inverse but parallel to the incoming rays by orientating the mirrors so that they are at right angles or perpendicular to each other.

According to one embodiment, waveguide 40 includes an input diffraction grating 42 and an output diffraction grating 44 disposed on opposite sides 88 and 84 of waveguide 40. Gratings 42 and 44 as shown in FIG. 2 are preferably reflective diffraction gratings that are parallel or perpendicular to each other in one embodiment. Gratings 42 and 44 are preferably symmetrical—matching each other in terms of diffraction angle and period. When image source 20 uses broadband light, matched gratings 42 and 44 correct for rainbow effects in one embodiment. Gratings 42 and 44 can be mismatched to a degree and still maintain periscopic effects, especially if monochromatic light (e.g., laser light) is used by source 20.

Gratings 42 and 44 in FIGS. 2 and 3 are preferably implemented as surface relief gratings in a high refractive index (e.g., n is greater than or equal to 1.5) dielectric materials, thereby enabling wider field of view with acceptable luminance. Gratings 42 and 44 can be implemented according to a number of techniques as discussed with reference to FIG. 4 below. In one embodiment, gratings 42 and 44 are reflective surface relief gratings fabricated using lithographic mastering in a wafer boundary. In the alternative embodiment, other types of gratings, reflective or transmissive, can be used. Gratings 42 and 44 can be located on either of sides 84 and 88 depending upon design considerations. Gratings 42 and 44 can also be implemented as holograms.

Applicants have found that HUD system 10 provides significant insensitivity across six degrees of freedom in one embodiment. Applicants have found that the display of information on system 10 can be extremely stable while waveguide 40 is rotated over large ranges even when waveguide 40 is handheld. Therefore, CAD-free operation can be obtained even with less expensive stow away mechanisms such as mechanism 800.

An alternative embodiment of HUD system 10 is shown with reference to FIG. 4. In FIG. 4, waveguide 40 includes gratings 42 and 44. Gratings 42 and 44 provide excellent image quality and acceptable brightness as well as providing a periscopic effect in accordance with an embodiment. Gratings 42 and 44 are preferably implemented as surface relief gratings in a high refractive index (e.g., N≥1.5) dielectric materials, thereby enabling wider field of view with acceptable luminance. Gratings 42 and 44 can be implemented according to a number of techniques. In one embodiment, gratings 42 and 44 are surface relief gratings fabricated using lithographic mastering in a wafer foundry. Gratings 42 and 44 are matched with respect to each other (e.g., diffract light at the same angle, and have the same period) and are parallel or perpendicular to each other according to one embodiment.

Applicants have found that surface relief gratings formed by lithographic mastering can have better performance in avionic HUD applications over holographic gratings. Surface relief gratings can be formed in high refractive index materials, such as, inorganic glass materials, thereby enabling wide field of view with acceptable luminance. Holographic gratings can have disadvantages related to angle dependency and wavelength sensitivity because such gratings often rely on low index modulation throughout a thick volume (ΔN is less than 0.05). In contrast to holographic gratings, surface relief gratings have much broader angular and spectral acceptance because the surface relief gratings can be extremely thin and use very high index modulations (ΔN equal to approximately 0.6-0.7), thereby satisfying the phase shift over a broad spectrum and angular range. Generally, longer wavelengths diffract at higher set of angles than shorter wavelengths. In certain embodiments, holographic gratings can also be used without departing from the scope of the invention.

In one embodiment, gratings 42 and 44 are etched directly in an inorganic high index material (e.g., glass material having refractive index of diffraction, N≥1.5) using reactive ion etching (RIE). This replication can utilize a step and repeat process with less than 100 nanometers repeatability.

Substrate waveguide 40 can be a single glass plate 78 or can be made from two or more fixed glass plates. Substrate waveguide 40 can have a variety of shapes including generally rectangular, oval, circular, tear drop-shaped, hexagonal, rectangular with rounded corners, square-shaped, etc.

In operation, substrate waveguide 40 advantageously receives light from image source 20 provided through collimating optics 30 at an input 72 and provides light to a user at its output 74. Image source 20 provides information using a single color of light (e.g., a single wavelength approximately between 525 and 550 nanometers (nm)). Light provided to substrate waveguide 40 is preferably linearly or S polarized and collimated. Alternatively, other polarization, multiple colors, or other colors at different wavelengths can be utilized without departing from the scope of the invention.

Substrate waveguide 40 preferably performs two operations in one embodiment. First, substrate waveguide 40 is disposed to provide a medium for transporting light by total internal reflection from input 72 to output 74. Light is reflected multiple times off of opposing main sides 84 and 88 of substrate 40 as it travels from input 72 to output 74. Second, substrate waveguide 40 operates as a combiner allowing the user to view the light from image source 20 at output 74 and light from the real world scene through sides 84 and 88.

With reference to FIG. 4, light from collimating optics 30 first strikes diffraction grating 42 at input 72 on side 84 of substrate waveguide 40. Grating 40 diffracts light toward the length of substrate 40 so that it travels by total internal reflection to output 74 on side 84. At output 74, diffraction grating 44 diffracts the light toward the user and out of the substrate waveguide 40. Diffraction grating 42 at input 72 preferably has a greater efficiency than diffraction grating 44 at output 74 in one embodiment. In one example, grating 42 has an efficiency of as high as possible (e.g., 50 percent or greater) and grating 44 has an efficiency low enough to provide a uniform image across output 74.

With reference to FIG. 2, diffraction gratings 42 and 44 are disposed on respective opposing sides 88 and 84 of substrate waveguide 40 in one embodiment. With reference to FIG. 4, gratings 42 and 44 can also be formed on the same side 84 of waveguide 40 in one alternative embodiment. In other alternative embodiments, gratings 42 and 44 can be disposed on side 84 or grating 42 can be disposed on side 84 and grating 44 can be disposed on side 88.

Gratings 42 and 44 preferably have a period of 330 nm (plus or minus 20 percent) nanometers. Grating 42 preferably has a trench depth of 100-150 nm, and grating 44 has a trench depth of 50-100 nm in one embodiment. Both gratings 44 and 42 preferably have a 40-70% duty cycle. The above values are exemplary only and do not limit the scope of the invention.

In one preferred embodiment, system 10 is configured to expand the pupil of system 10 in a single axis (e.g., in the vertical direction). In one embodiment, substrate waveguide 40 provides an approximately 100 mm vertical×75 mm horizontal exit pupil. Waveguide 40 can effect the single axis pupil expansion. The single axis expansion can be on the order of 3 to 8 times (e.g., approximately 5.8 times in one preferred embodiment). Other orders of pupil expansion are possible depending upon performance criteria, design parameters, and optical components utilized without departing from the scope of the invention.

Figure 5:
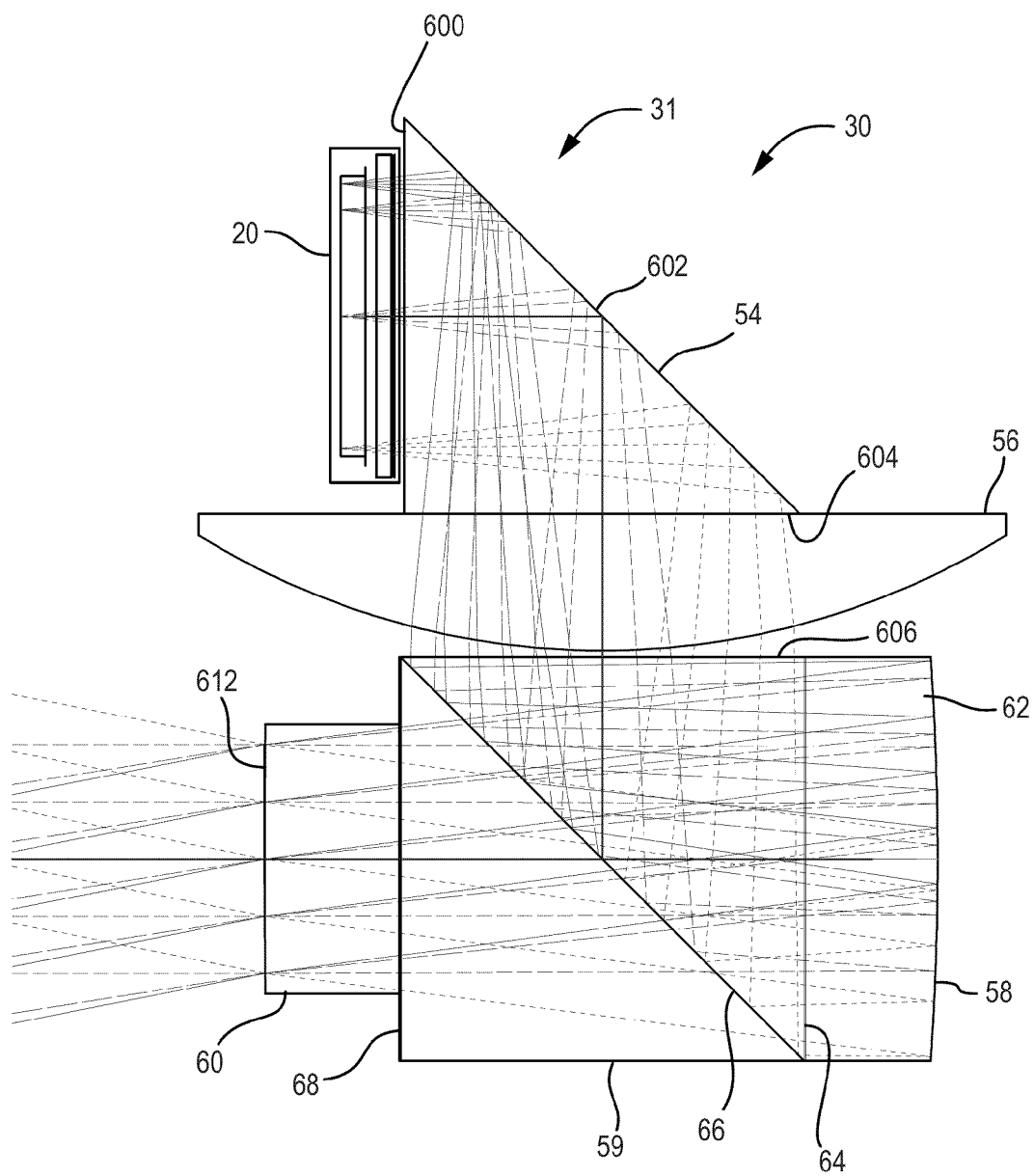
FIG. 5 is a side view schematic drawing of collimating optics for the system illustrated in FIG. 2 in accordance with another exemplary embodiment.

With reference to FIG. 5, collimating optics 30 can be an assembly 31 disposed adjacent to image source 20 in accordance with an embodiment. Assembly 31 of collimating optics 30 is preferably a catadioptric folded collimator system and includes a fold prism 54, a field lens 56, a beam splitter 59, a curved mirror 58 and a corrective lens 60. Corrective lens 60 is disposed to provide collimated light to diffraction grating 42 (FIG. 2). Fold prism 54 receives polarized light from image source 20 at a face 600.

The light received at face 600 from image source 20 is bounced by total internal reflection off a surface 602 of prism 54 to an exit surface 604. Exit surface 604 is disposed to provide light to field lens 56. Field lens 56 provides light to an input surface 606 of beam splitter 59. Field lens 56 is preferably configured as a field flattener lens, such as a plano-convex spherical lens. Alternatively, fold prism 54 can be a mirror or include a mirrored surface. In alternative embodiment, fold prism 54 is not required for assembly 51 and lens 64 can receive light directly from image or source 20.

Beam splitter 59 is preferably configured as a polarizing beam splitter. Curved mirror 58 includes a curved reflective surface 62. Surface 62 provides a catoptric element which in conjunction with a refractive (dioptric) element, such as, lens 60, provides a catadioptric system. Corrective lens 60 is preferably an aspheric lens.

Beam splitter 59 provides a folded optical path and can include a retarder film 64, an internal partially reflective surface 66 and a retarder film 68. Film 64 can be a quarter wave retarder film, and film 68 can be a one half wave retarder film. Films 68 and 64 preferably control the polarization states for efficient light transmission. Film 68 can be optional depending on polarization characteristics of down stream optics.

Light received at partially reflective internal surface 66 of splitter 59 from input surface 606 is reflected through film 64 to curved surface 62. Light reflecting from surface 62 is provided through film 64, partially reflective internal surface 66, and film 68 to corrective lens 60. A combination of elements in collimating optics 30 collimates light at an exit pupil 612 associated with corrective lens 60. Applicants believe that collimating optics 30 embodied as a catadioptric system advantageously assists in making the design of HUD system 10 nearly 10 times smaller in volume than conventional HUD designs in one embodiment.

Assembly 31 of collimating optics 30 as embodied in FIG. 8 advantageously provides a relatively low optical element count with a short focal length. The F ratio (the ratio of pupil diameter to focal length) is kept very low in one embodiment. In addition, assembly 31 of collimating optics 30 as embodied in FIG. 6 efficiently handles polarized light and provides a compact high performance collimating solution.

As shown in FIG. 5, collimating optics 30 can be similar to a Schmidt camera arrangement in one exemplary embodiment. Preferably, prism 54, lens 56, collimating or curved mirror 58, splitter 59 and lens 60 are cemented together as assembly 31 with film 64 disposed between mirror 58 and beam splitter 59 and film 68 disposed between lens 60 and beam splitter 59. Advantageously, arrangement 31 of collimating optics 30 uses a combination of low-ratio reflective optics in an on-axis arrangement with polarizing beam splitter 59 and exit pupil 612 being truncated. The low-ratio optics provides the advantage of achieving a biocular view with image source 20 having a small width. The on-axis arrangement allows excellent aberration correction and low element count. The reflective optics provide low chromatic dispersion and polarizing beam splitter 59 allows optics 30 to be used on axis (no tilted or de-centered elements) while folding image source 20 out of the way and simultaneously providing efficient handling of polarization states in one embodiment.

In one embodiment, collimating optics 30 can provide a 30 degree field of view from image source 20 embodied as a 1.3 inch or less diagonal LCD which translates into a focal length of approximately 2 inches. Exit pupil 612 is preferably wide enough to allow biocular viewing (e.g., approximately 3 inches which forces the F ratio to be approximately 0.67 or ⅔). In one embodiment, optics 30 provide a field of view of 30 degrees horizontally by 18 degrees vertically. An exemplary exit aperture for optics 30 is rectangular having dimensions of 4 inches×1 inch which can be extended to be 4 inches by 4 inches by waveguide 40. Assembly 31 of collimating optics 30 advantageously provides excellent performance, meeting requirements for efficiency, color correction and collimation accuracy.

In one embodiment, exit pupil 612 from lens 60 is truncated to 17 millimeters vertical by 75 millimeters horizontal. This truncation allows system 10 to be folded into a very compact volume. Advantageously, substrate waveguide 40 provides pupil expansion in one direction to achieve a 100 millimeter vertical by 75 millimeter horizontal pupil in one embodiment. Assembly 31 preferably has a cross section that is only approximately 50 millimeters×70 millimeters or less in one embodiment.

Figure 6:
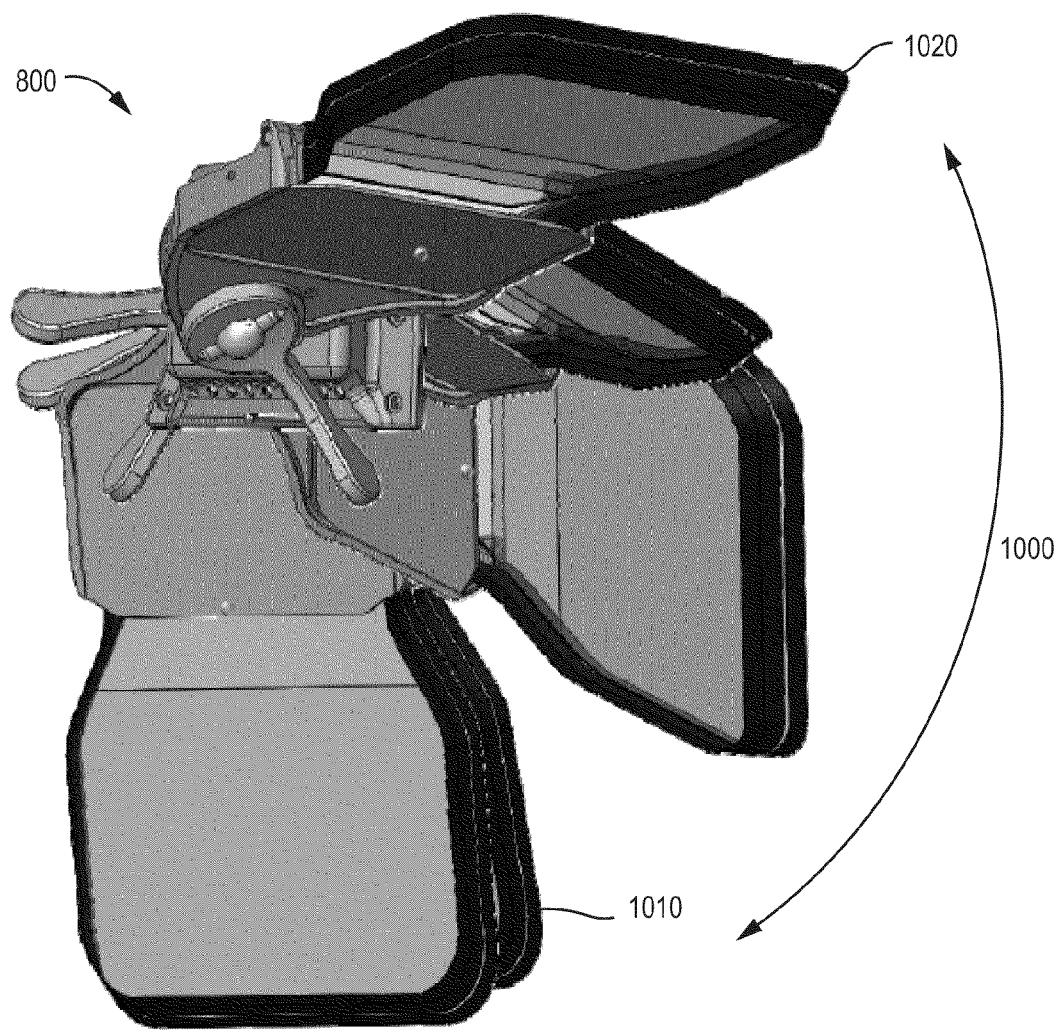
FIG. 6 is a perspective view schematic drawing of an embodiment of the HUD system illustrated in FIG. 2 and attached to a stow mechanism in accordance with another exemplary embodiment.

With reference to FIG. 6, HUD system 10 (FIG. 2) can be packaged as a compact HUD system 820. HUD system 820 can be attached to a stow mechanism 800. Mechanism 800 includes a break-away mechanism and allows waveguide 40 to be moved across stow path 1000 to and from a stowed position 1020 and an operational position 1010. The periscope effect can be maintained as combiner or waveguide 40 travels across the stow path. The specific shape and structure of system 820 and mechanism 800 is not shown in a limiting fashion.

It is understood that while the detailed drawings, specific examples, material types, thicknesses, dimensions, and particular values given provide one exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Various changes may be made to the details disclosed without departing from the spirit of the invention which is defined by the following claims.

What is claimed is:

1. A head up display for providing an image and being employed without a combine alignment detector, the head up display comprising:
   a micro-image source;
   collimating optics configured to receive the image from the micro-image source, wherein the collimating optics form a catadioptric optical system comprising a folded path comprising a fold component, a first lens, a polarizing beam splitter, a collimating mirror and a corrective lens in an on-axis arrangement and wherein the first lens is attached to the polarizing beam and is disposed between the polarizing beam splitter and the micro-image source;

a combiner receiving collimated light from the collimating optics at an input and providing the collimated light to an output, the collimated light traveling from the input to the output within the combiner by total internal refraction; and a stow mechanism configured to move the combiner out of a head path in a crash event or to move the combiner to and from an operational position and a stowed position, wherein an input diffraction grating is disposed at the input and an output diffraction grating is disposed at the output, whereby the combiner is configured to achieve a periscopic effect.

2. The display of claim 1, wherein the stow mechanism rotates the combiner clockwise or counter clockwise from a viewpoint of a pilot using the head up display in a geometric plane containing the combiner in the operational position when the combiner is moved from the operational position to the stowed position.

3. The system of claim 1, wherein the combiner provides pupil expansion.

4. The system of claim 1, wherein the stow mechanism is configured to rotate the combiner about a first axis and twists the combiner about a second axis as the combiner is moved across a stow path from the operational position to the stow position, wherein the second axis is parallel to a central axis extending longitudinally down the combiner.

5. The system of claim 1, wherein the combiner is a substrate waveguide and the input diffraction grating and output diffraction grating are surface relief diffraction gratings.

6. The system of claim 1, wherein the fold component is a fold prism.

* * * * *